(12) United States Patent
Yen

(10) Patent No.: US 6,868,266 B2
(45) Date of Patent: Mar. 15, 2005

(54) MULTI-PURPOSE SAFETY MANAGEMENT SYSTEM

(76) Inventor: Sen Hui Yen, No. 3, Tzu Chiang I Rd., Chung Li City, Tao Yuan Hsien (TW)

(*) Notice: Subject to any disclaimer, the term of this patent is extended or adjusted under 35 U.S.C. 154(b) by 436 days.

(21) Appl. No.: 10/191,938

(22) Filed: Jul. 10, 2002

(65) Prior Publication Data

US 2003/0013463 A1 Jan. 16, 2003

(30) Foreign Application Priority Data

Jul. 10, 2001 (CN) .......................................... 01120183 A (51) Int. Cl.[7] .......................................... H04M 11/04
(52) U.S. Cl. ................ 455/404.2; 455/461; 455/456.6; 455/456.3; 455/456.1; 455/90.1; 340/426.19; 340/539.13; 342/357.06; 342/357.1; 342/450; 342/463
(58) Field of Search .............................. 455/461, 404.1, 455/456.1–456.6, 414.1–414.2, 40.1; 340/426.17–426.19, 539.1–539.13; 392/357.06–357.1, 357.13, 357.16, 450–451, 457–458, 463

(56) References Cited

U.S. PATENT DOCUMENTS 6,373,389 B1 * 4/2002 Przygoda et al. ........ 340/572.4
6,472,976 B1 * 10/2002 Wohl ........................ 340/10.41
6,563,423 B2 * 5/2003 Smith ....................... 340/572.1
6,624,754 B1 * 9/2003 Hoffman et al. ......... 340/573.1
6,696,956 B1 * 2/2004 Uchida et al. ............ 340/573.1
6,716,101 B1 * 4/2004 Meadows et al. ........ 455/456.1
6,741,161 B1 * 5/2004 Kim et al. .................... 340/7.1
6,788,200 B1 * 9/2004 Jamel et al. ............ 340/539.13

* cited by examiner

Primary Examiner—Lester G. Kincaid
Assistant Examiner—Marcos L. Torres (57) ABSTRACT

The present invention provides a smart all-purpose expert management system, which integrates a global positioning system, a digital remote monitoring system, the Internet, and various kinds of communication networks like the satellite communication network, the public switch telephone network, and the mobile phone system. The smart all-purpose expert management system can provide all-purpose personal life real-time services for the user. The service items include global personal safety guard, home safety guard, personal exclusive database management, personal life secretary, global communication service of single telephone number, communication group setting, and so on.

21 Claims, 13 Drawing Sheets

MULTI-PURPOSE SAFETY MANAGEMENT SYSTEM

FIELD OF THE INVENTION

The present invention relates to a smart all-purpose expert management system and, more particularly, to a smart all-purpose expert management system capable of providing all-purpose personal life real-time services. The service items include global personal safety guard, home safety guard, personal exclusive database management, personal life secretary, global communication service of single telephone number, and communication group setting.

BACKGROUND OF THE INVENTION

In a conventional supervisory control system, video cameras are placed at sites to be monitored, and video images are transmitted back to a control center in wired or wireless transmission way to provide remote supervisory control function, hence protecting the safety of people or articles.

Because the video cameras of the conventional remote supervisory control system need to be placed at fixed sites, the conventional remote supervisory control system can only provide image information in a fixed range. For a mobile person, because he can freely enter or leave the monitored range, the conventional remote supervisory control system cannot provide complete supervisory control, and dead spaces in safety may easily arise.

Besides, the conventional remote supervisory control system only provides remote supervisory control function, but cannot provide extra services like personal exclusive database management, personal life secretary, communication service of single telephone number, and so on, its service range is very narrow, and cannot provide all-purpose services for a user.

SUMMARY OF THE INVENTION

The present invention can provide home safety guard and global personal safety guard for a user, and can let the user issue various kinds of instructions to acquire various kinds of information required in life. The present invention can also provide global communication service of signal telephone number so that relatives and friends of the user or the set communication group can use the provided single telephone number to communicate with him.

To achieve the above object, the present invention provides a personal all-purpose safety guard and life service system, which comprises an end user terminal with a GPS device (briefly termed as a GEUT), a control center, a remote supervisory control system, and a communication network.

The GEUT switches on required equipments for services of the system. The GEUT sends out an identification code representing a user's identification and moving vector to the control center so that the control center can ensure the user's identity and open all-purpose personal life real-time services for the user.

Besides, the GEUT will automatically receive operational longitude and latitude data of its site, and then calculate out the longitude and latitude of its site.

After the GEUT calculates out the longitude and latitude data of its site, it will automatically transmit the longitude and latitude data back to the control center. The control center can integrate the data with an electronic map to find out where the user is. Besides, the user can connect an external digital access display equipment with the GEUT, and use the digital access display equipment to integrate the longitude and latitude data with the electronic map so as to find out where the user is in real time.

The GEUT will automatically detect the speed of variation of site. When the user's speed increases, the GEUT will increase the transmitted times and contents of the longitude and latitude data to the control center. When the user's speed decreases, the GEUT will decrease the transmitted times and contents of the longitude and latitude data to the control center. Therefore, the present invention has the advantage of reducing network's load.

Besides, the GEUT also provides the following selective functions.

1. Code setting:
   a. turn-on (activation) code
   b. turn-off (offline) code
   c. setting of timing code input request
   d. code input request for receiving messages of the control center
2. emergency function key
3. traffic status inquiry
4. car dispatch
5. destination route inquiry
6. group broadcast
7. nearby facilities inquiry
8. telephone communication request
9. life schedule plan The user can set a code to avoid misappropriation of his terminal by others, emit out an emergency SOS signal to the control center through the emergency key to obtain timely help, and send various kinds of instructions to the control center through other choices to obtain various kinds of real-time information and services. The choices set on the GEUT are not limited to the above ones, and can supplement other service function choices according to user's requirement.

In the system of the present invention, the control center is the system's core. All the required services of user are provided by the control center. The control center has an expert service system to provide the most real-time and appropriate services for the user. The provided services include:

1. Global personal safety guard: The control center acquires through network the longitude and latitude data of the site where a user is, and integrates the data with an electronic map in the system to accurately determine where the user is and guard him.
2. Home safety guard: The control center acquires real-time information like videos and sounds provided by a computer having a remote supervisory control system to guard home safety for the user.
3. Personal exclusive database management: The control center provides personal database for the user to categorically store personal data like the real-rime position where the user is, monitored videos and sounds for user's home safety, nearby life information around the GEUT, thereby facilitating inquiry of the user and automatic processing of the control center.
4. Personal life secretary: The control center provides everyday schedule help like booking and making reservation on behalf of the user.
5. Automatic data inquiry: The control center automatically inquires various kinds of data like positions of hospitals and gas stations near the site where the user is.

6. Global communication service of single telephone number: The control center provides a telephone number for the user. When the control center receives a signal requesting to communicate with the user, if the user is online, the control center will automatically find out the user's position, and integrate this position with the contact telephone number provided by the user to find out the best communication route so that the user and the one requesting for communication with him can enjoy cheap and high-efficiency communication quality. If the user is offline, the control center will automatically transfer this call to the user's position according to the contact telephone number provided by the user.

7. Setting of communication group: The user can communicate with the control center through communication networks like public switch telephone network (PSTN) and wireless phone network to set the range of target that he wants to communicate with.

In practical application of the present invention, the functions can increase or decrease according to user's necessity.

In the present invention, the remote supervisory control system comprises a digital remote monitoring system, a video phone, and a bi-directional sensor. The remote supervisory control system provides home safety for the user, and uploads the recorded videos and sounds and the signals emitted by the sensor to the control center so that the control center can momentarily acquire home safety information of the user. The user can thus momentarily acquire real-time or past data of the recorded videos and sounds through the control center. Besides, the user can use the video phone on the remote supervisory control system to make real-time communication with safety personnel through the control center.

In the present invention, the communication network is the center of data transmission of the system, and can build connection between the user and the control center to meet the requirement of intercommunication of data. The control center can connect to public/private databases, various kinds of service providers, the remote supervisory control system, and other terminal equipments to collect various kinds of real-time information. The communication network includes the mobile phone network, the trunking radio network, the mobile base stations, the public switch telephone network, the Internet, and the satellite communication network.

The various objects and advantages of the present invention will be more readily understood from the following detailed description when read in conjunction with the appended drawing, in which:

DETAILED DESCRIPTION OF THE PREFERRED EMBODIMENTS

Figure 1:
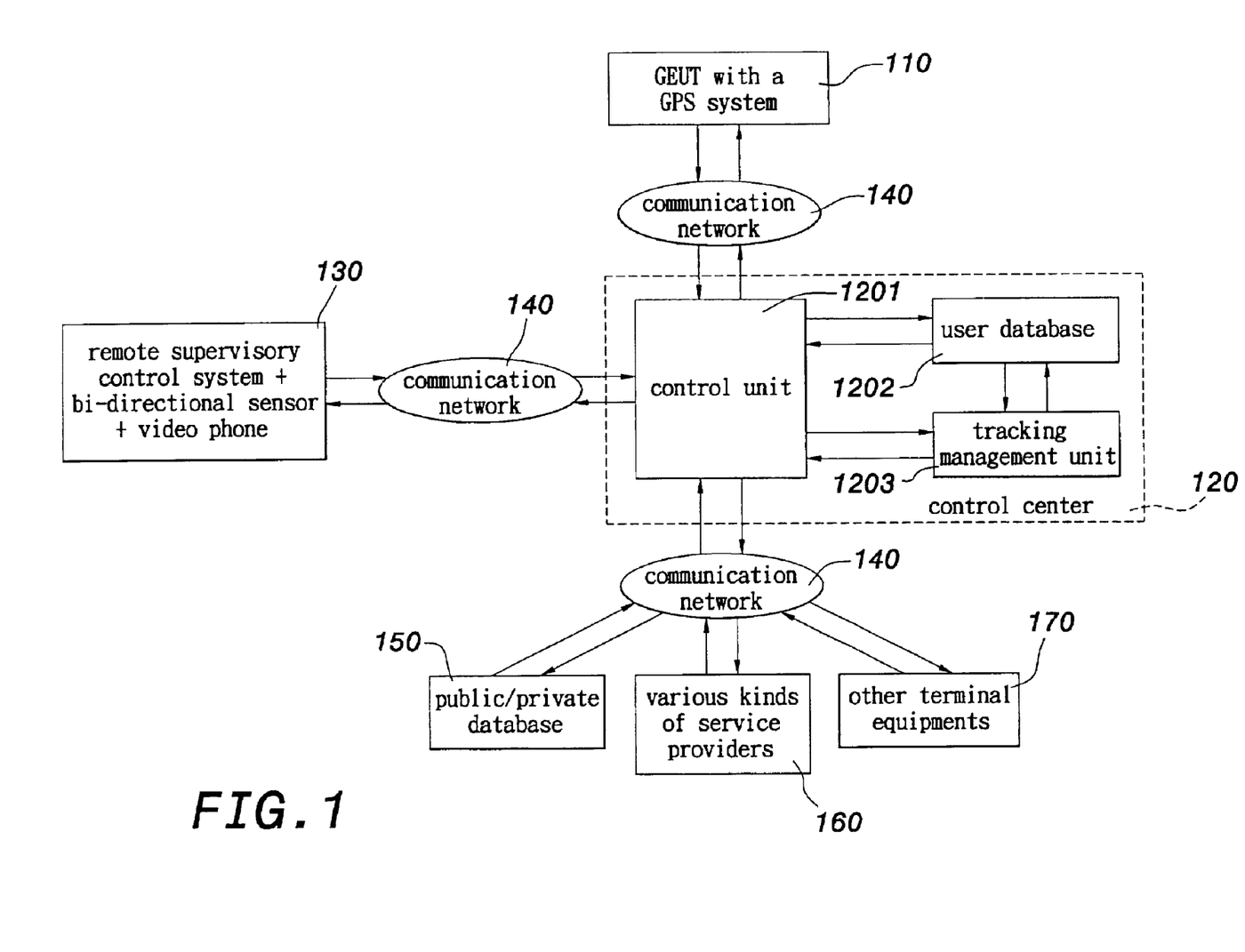
FIG. 1 is a system architecture diagram of the present invention.

As shown in FIG. 1, a smart all-purpose expert management system of the present invention comprises a GEUT 110, a control center 120, a remote supervisory control system 130, a communication network 140, public/private databases 150, various kinds of service providers 160, and other terminal equipments 170.

The GEUT 110 comprises emitting and receiving devices, a microprocessor, and a memory, and can connect the control center 120 through the communication network 140. The control center 120 comprises a control unit 1201, a user database 1202, a tracking management unit 1203, and system software, and is the core of the system. The control center can connect the GEUT 110, the remote supervisory control system 130, the public/private databases 150, the service providers 160, and the terminal equipments 170 through the communication network 140. The remote supervisory control system 130 comprises a digital remote monitoring system, a video phone, and a bi-directional sensor, and can connect the control center 120 through the communication network 140. The communication network 140 comprises the mobile phone network, the trunking radio network, the mobile base station, the public switch telephone network, the Internet, and the satellite communication network. The public/private databases 150 are various kinds of data centers, and can connect the control center 120 through the communication network 140. The service providers 160 are various kinds of hotels, restaurants, banks, public means of transport, and can connect the control center 120 through the communication network 140. The terminal equipments 170 are common personal computers, notebook computers, mobile phones, and wired telephones, and can connect the control center 120 through the communication network 140.

Figure 1A:
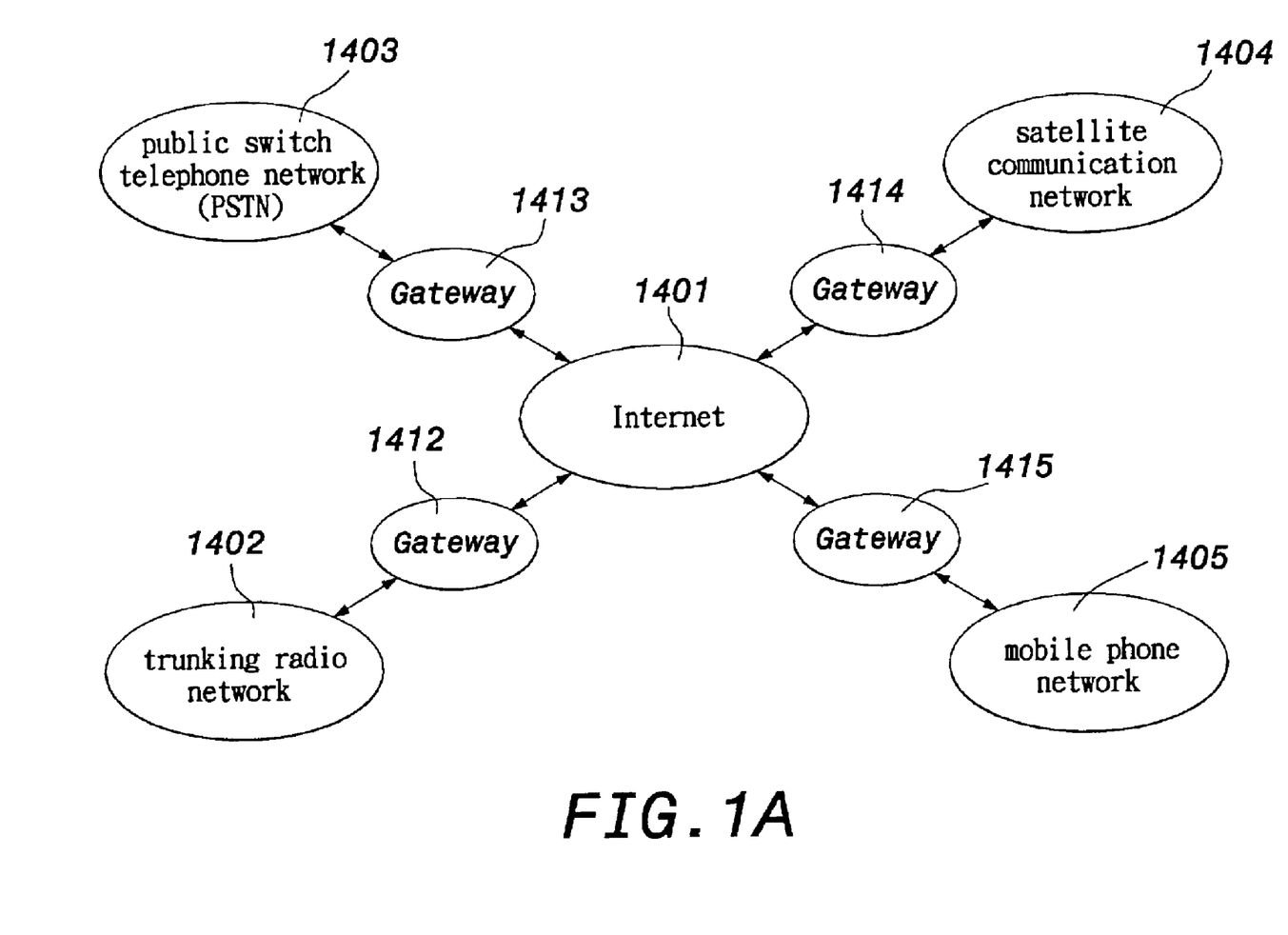
FIG. 1A is architecture diagram of the communication network.

As shown in FIG. 1A, the communication network 140 include the Internet 1401, the trunking radio network 1402, the public switch telephone network 1403, the satellite communication network 1404, and the mobile phone network 1405. The trunking radio network 1402, the public switch telephone network 1403, the satellite communication network 1404, and the mobile phone network 1405 are connected to the Internet 1401 via gateways 1412, 1413, 1414, and 1415, respectively. The communication network 140 is not limited to the above the Internet 1401, the trunking radio network 1402, the public switch telephone network 1403, the satellite communication network 1404, and the mobile phone network 1405, and can add in other communication networks or ways. Besides, the connection architecture between networks is not limited to the above radial structure, and depends on the requirement and design.

FIGS. 2 to 10 show the operational flowchart according to an embodiment of the present invention. The flowchart comprises the following steps.

Figure 2:
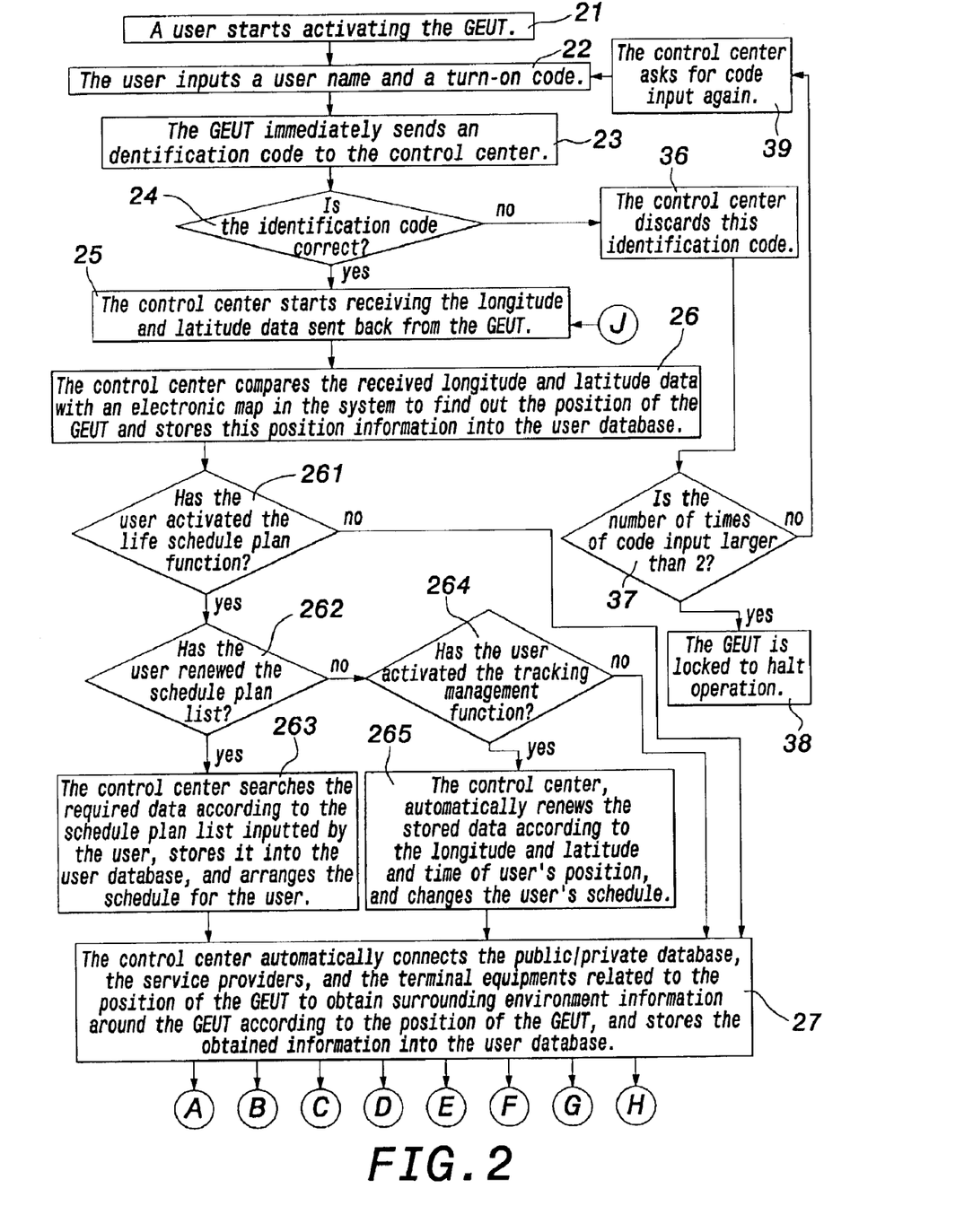
FIG. 2 is an operational flowchart according to an embodiment of the present invention.

Step 21: A user starts activating the GEUT 110;

Step 22: After the GEUT 110 is activated, the user is asked to input his representative name and turn-on code in the system.

Step 23: After the user inputs his representative name and turn-on code in the system, the GEUT 110 immediately converts the inputted representative name and turn-on code into an identification code representing the user's identity and moving vector, and transmits this identification code to the control center 120.

Step 24: After the control center 120 receives the identification code representing the user's identity and moving vector, it immediately check this identification code. If the identification code is correct, Step 25 is jumped to; otherwise, Step 36 is jumped to.

Step 25: After the identification code representing the user's identity and moving vector is checked by the control center 120 to be correct, the control center 120 immediately starts receiving the longitude and latitude data transmitted from the GEUT 110.

Step 26: After the control center 120 receives the longitude and latitude data transmitted from the GEUT 110, it immediately compares this data with an electronic map in the system to find out the exact position of the GEUT 110 and stores this position information into the user's exclusive database. Step 261 is then jumped to.

Step 261: The control center 120 detects whether the user has activated the life schedule plan function. If the answer is positive, Step 262 is jumped to; otherwise, Step 27 is jumped to.

Step 262: The control center 120 detects whether the user has renewed the schedule plan. If the answer is positive, Step 263 is jumped to; otherwise, Step 264 is jumped to.

Step 263: The control center 120 searches the required data according to the schedule plan inputted by the user, stores it into the user database, and arranges the predetermined schedule for the user. Step 27 is then jumped to.

Step 264: The control center 120 detects whether the user has activated the tracking management function. If the answer is positive, Step 265 is jumped to; otherwise, Step 27 is jumped to.

Step 265: The control center 120 compares the user's schedule plan according to the longitude and latitude of user's position, automatically renews the data stored in the user database, and amends the user's schedule plan. Step 27 is then jumped to.

Step 27: After the control center 120 finds out the exact position of the GEUT 110, it automatically connects the public/private database 150, the service providers 160, and the terminal equipments 170 related to this position to obtain real-time information like positions of the nearest gas station and the nearest hospital around the GEUT 110. Meanwhile, the control center 110 stands by and waits to receive an instruction issued by the user. If the user is at a state of emergency and needs help, Step 28 is jumped to. If the user needs to inquire about the traffic status, Step 29 is jumped to. If the user needs the car dispatch service, Step 30 is jumped to. If the user needs to inquire about the destination route, Step 31 is jumped to. If the user needs to inquire about the group broadcast service, Step 32 is jumped to. If the user needs to inquire about nearby facilities, Step 33 is jumped. If the user wants to be offline, Step 34 is jumped to. If the user needs no service, Step 35 is jumped to.

Figure 3:
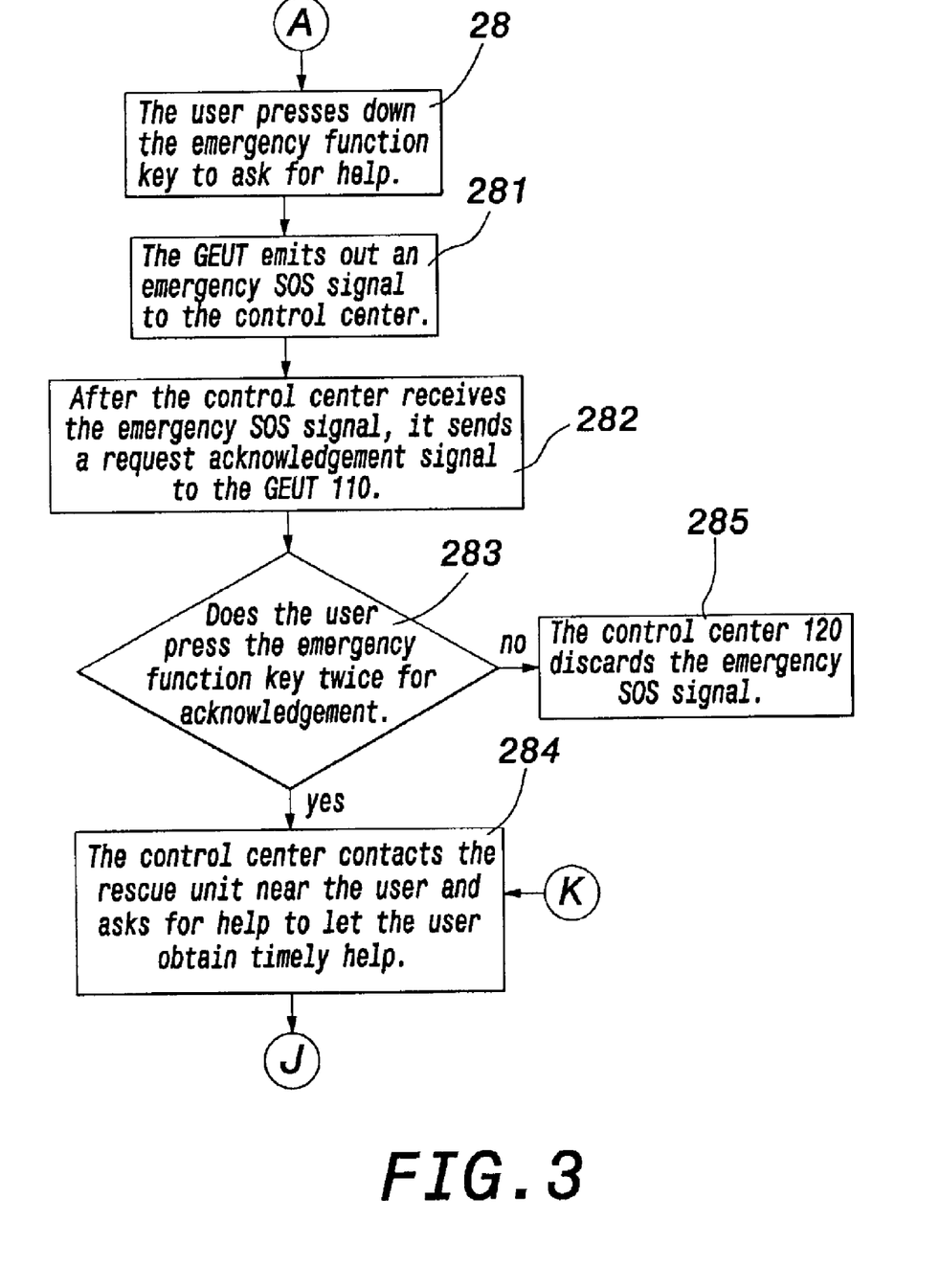
FIG. 3 is an operational flowchart of using an emergency key according to the embodiment of the present invention.

Step 28: When the user is at a state of emergency and needs help, he can press down the emergency function key to ask for help.

Step 281: The GEUT 110 immediately emits out an emergency SOS signal to the control center 120.

Step 282: After the control center 120 receives the emergency SOS signal, it immediately sends a request acknowledgement signal to the GEUT 110 to make sure whether the user really needs emergent help.

Step 283: After the GEUT 110 receives the request acknowledgement signal, the user can continually press the emergency function key twice to provide an acknowledgement signal to the control center 120, and Step 284 is then jumped to. If it is merely that the user wrongly presses the emergency function key, the user needs not to provide the acknowledgement signal to the control center 120, and Step 285 is then jumped to. The acknowledgement signal is not limited to continually pressing the emergency function key twice, and can be designed according to the system designer himself.

Step 284: After the control center 120 receives the acknowledge signal provided by the user, it will contact the rescue unit near the user and ask for help to let the user obtain timely help. Step 25 is then jumped to.

Step 285: After a fixed time elapses, if the control center 120 does not receive the user's acknowledgement signal, it will discard the emergency SOS signal. Step 25 is then jumped to.

Figure 4:
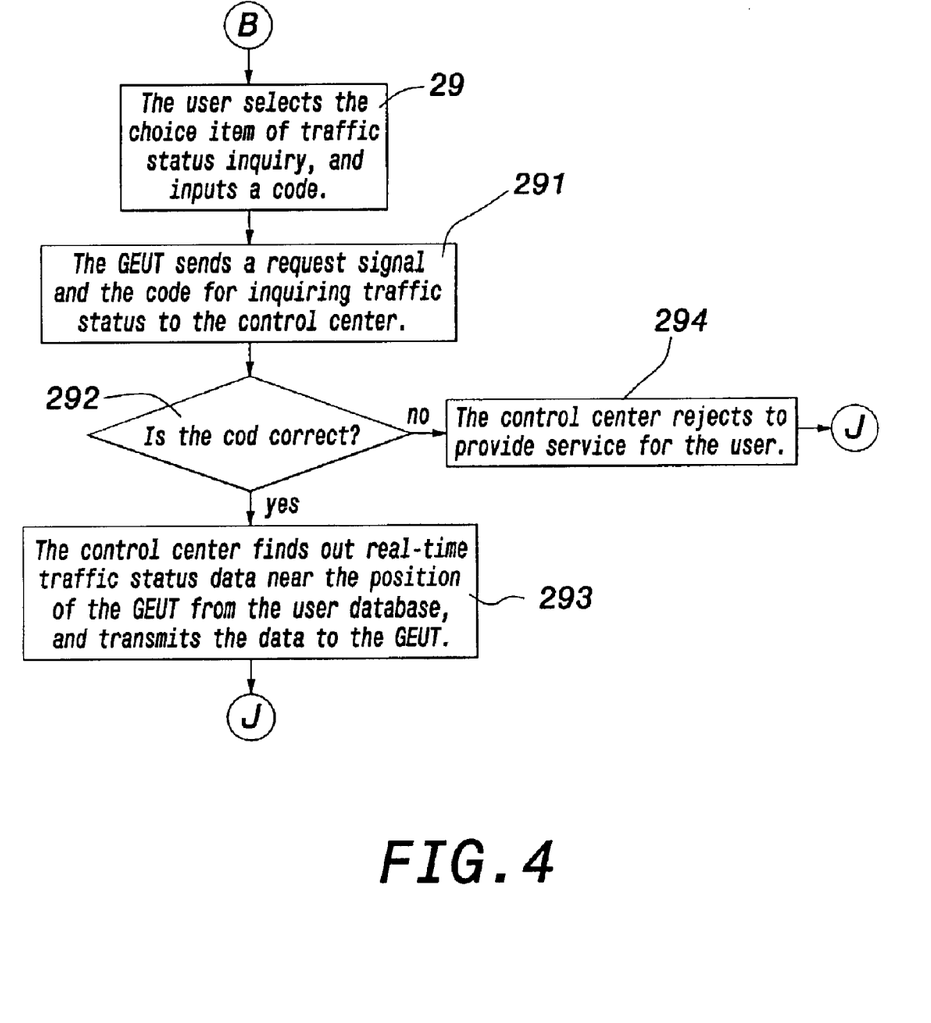
FIG. 4 is an operational flowchart of the traffic status inquiry service according to the embodiment of the present invention.

Step 29: The user selects the item of traffic status inquiry, and inputs a code for receive message of the control center's messages.

Step 291: After the user selects the item of traffic status inquiry and inputs a code for receive message of the control center's messages, the GEUT 110 immediately emits out a request signal and code for inquiring traffic status to the control center 120.

Step 292: After the control center 120 receives the request signal and code for inquiring traffic status, it immediately checks the code. If the code is correct, Step 293 is jumped to; otherwise, Step 294 is jumped to.

Step 293: The control center 120 finds out traffic status data near the position of the GEUT 110 from the user database and transmits the data to the GEUT 110.

Step 294: The control center 120 rejects to provide service for the user, and Step 25 is then jumped to.

Figure 5:
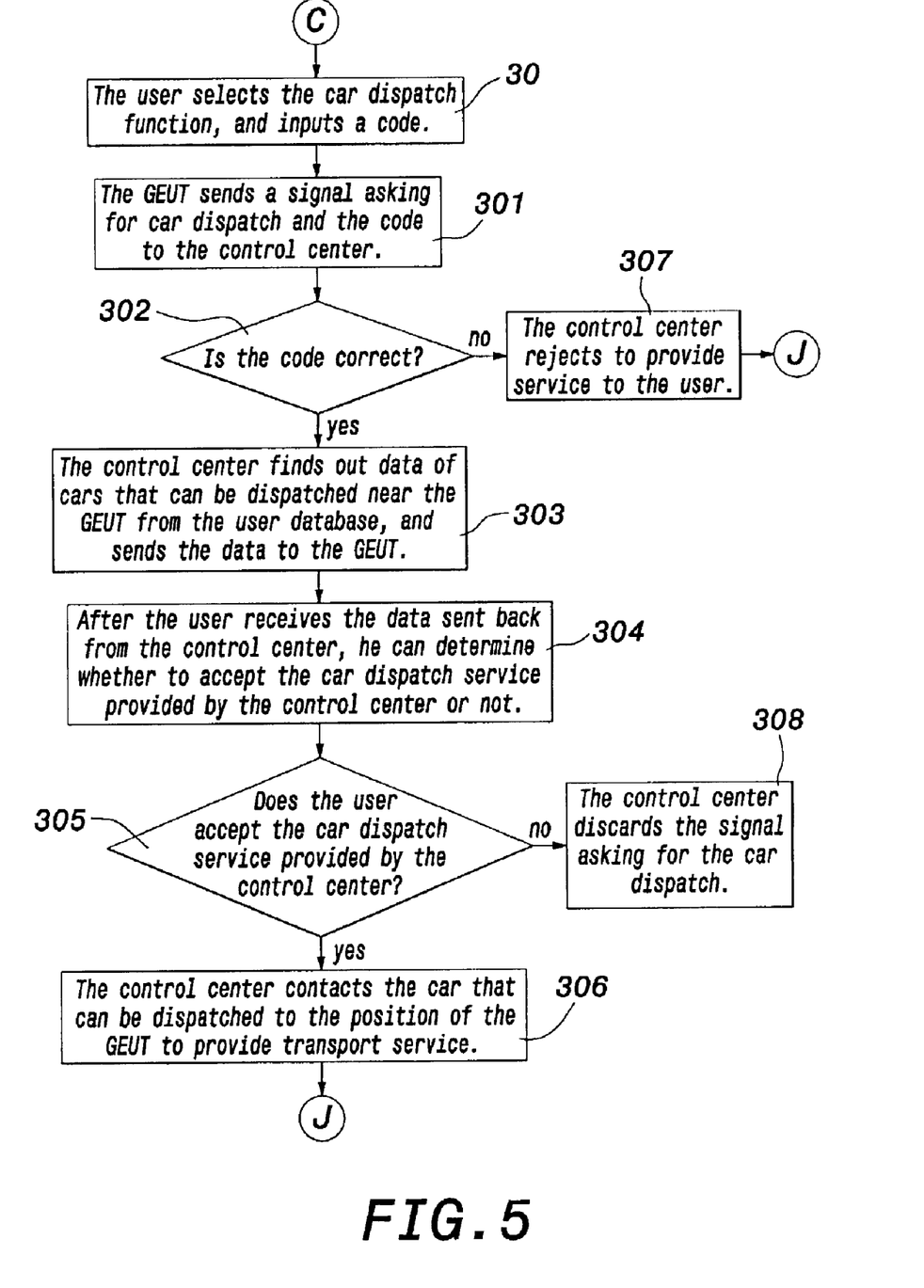
FIG. 5 is an operational flowchart of the car dispatch service according to the embodiment of the present invention.

Step 30: The user selects the car dispatch item, and inputs the code for receiving messages of the control center 120.

Step 301: After the user selects the car dispatch item and inputs the code for receiving messages of the control center 120, the GEUT 110 immediately sends out the car dispatch signal and code to the control center 120.

Step 302: After the control center 120 receives the car dispatch signal and code, it immediately checks the code. If the code is correct, Step 303 is jumped to; otherwise, Step 307 is jumped to.

Step 303: The control center 120 finds out data of cars that can be dispatched near the GEUT 110 from the user database, and sends back to the GEUT 110.

Step 304: After the user receives the data sent back from the control center 120, he can determine whether to accept the car dispatch service provided by the control center 120 or not.

Step 305: If the user determines to accept the car dispatch service provided by the control center 120, he can emit out an acknowledgement signal, and Step 306 is then jumped to; otherwise, Step 308 is jumped to.

Step 306: After the control center 120 receives the acknowledgement signal, it immediately contacts the car that can be dispatched to the position of the GEUT 110 to provide transport service, and Step 25 is then jumped to.

Step 307: The control center 120 rejects to provide service to the user, and Step 25 is then jumped to.

Step 308: The control center 120 discards the signal asking for the car dispatch service.

Figure 6:
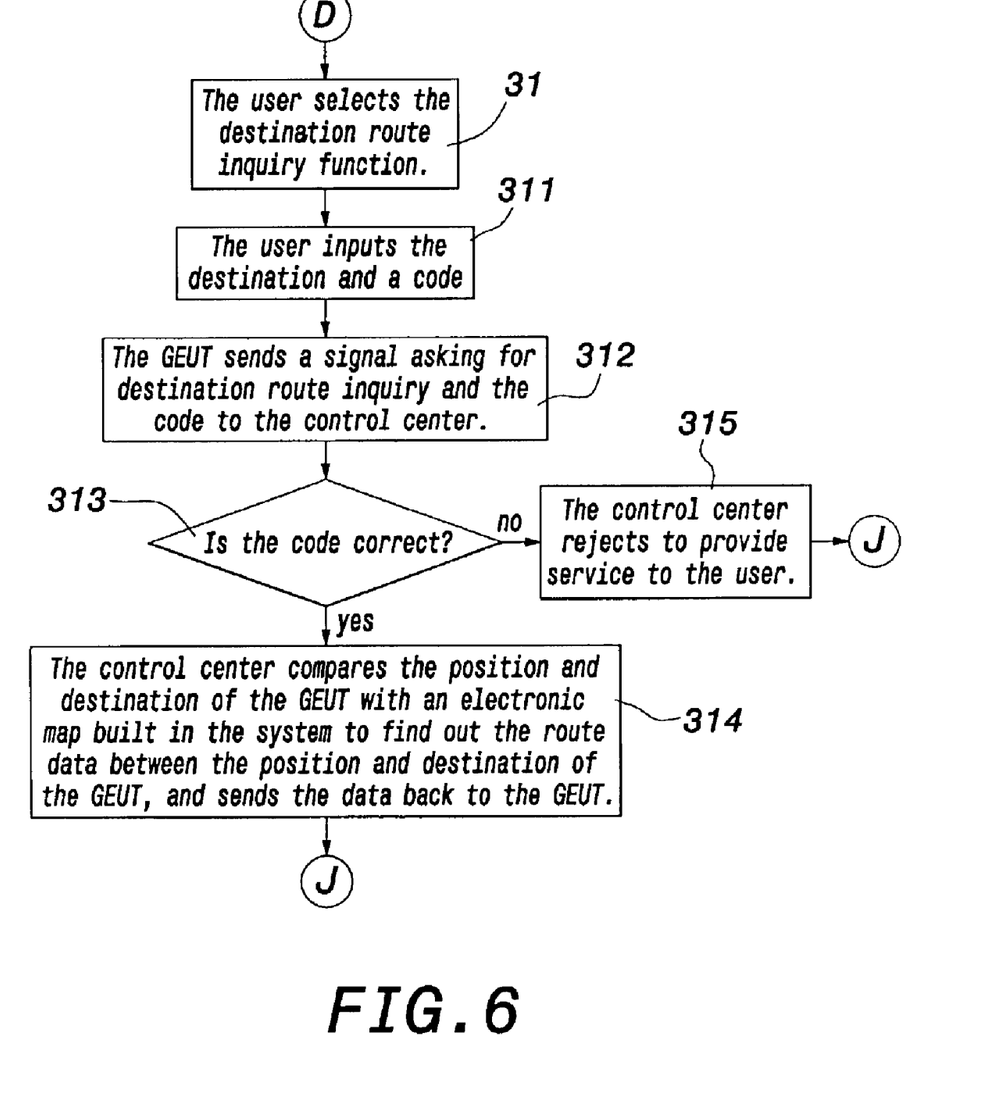
FIG. 6 is an operational flowchart of the destination route inquiry service according to the embodiment of the present invention.

Step 31: The user selects the destination route inquiry item.

Step 311: The user inputs the code for receiving messages of the control center 120 and the destination.

Step 312: After user selects the destination route inquiry item, and inputs the code for receiving messages of the control center 120 and the destination, the GEUT immediately sends out the destination route inquiry signal and code to the control center 120.

Step 313: After the control center 120 receives the destination route inquiry signal and code, it immediately checks the code. If the code is correct, Step 314 is jumped to; otherwise, Step 315 is jumped to.

Step 314: The control center 120 compares the position and destination of the GEUT 110 with an electronic map built in the system to find out the route data between the position and destination of the GEUT 110, and sends back to the GEUT 110, and Step 25 is then jumped to.

Step 315: The control center rejects to provide service to the user, and Step 25 is then jumped to.

Figure 7:
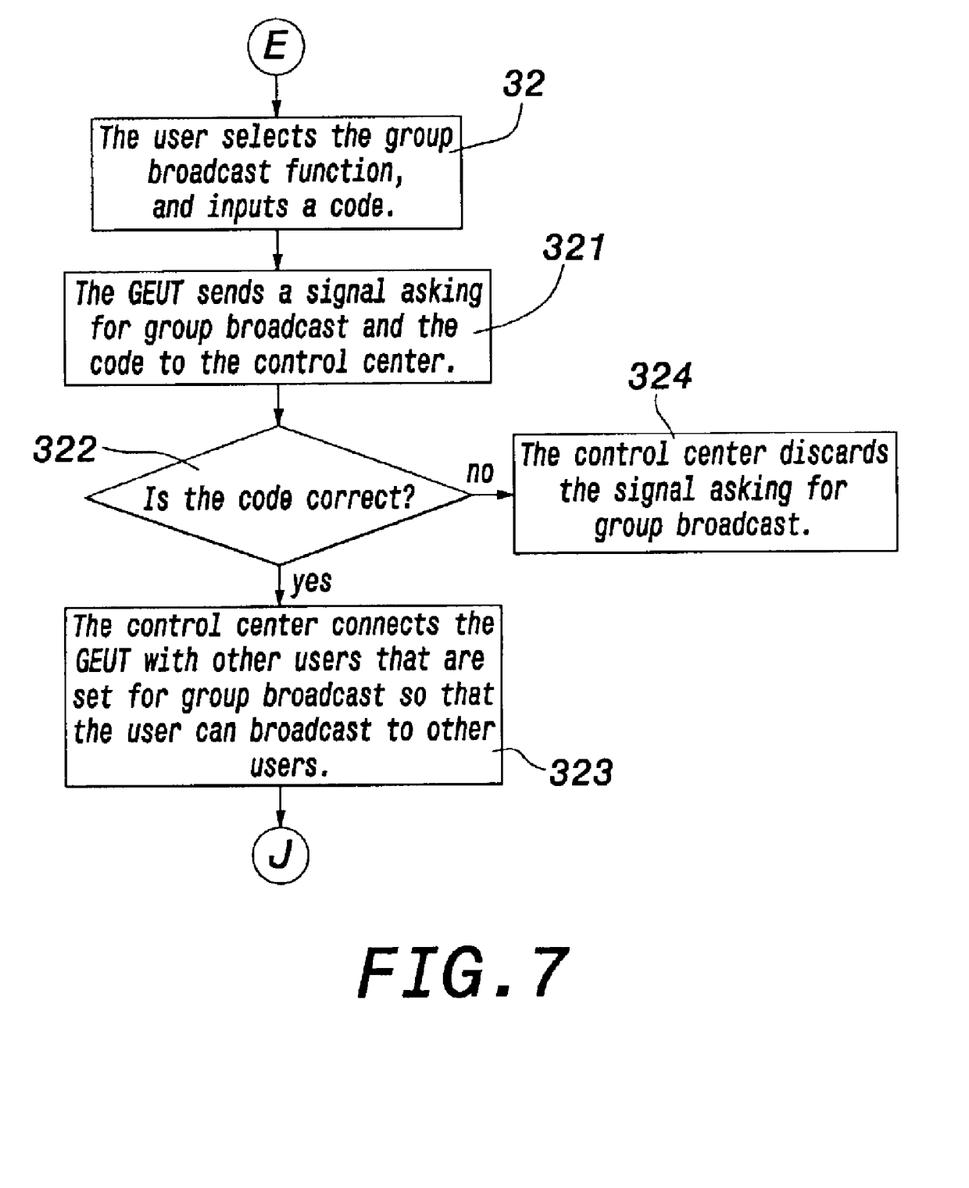
FIG. 7 is an operational flowchart of the group broadcast service according to the embodiment of the present invention.

Step 32: The user selects the group broadcast item, and inputs the group broadcast code.

Step 321: The GEUT 110 sends the group broadcast signal and code to the control center 120.

Step 322: After the control center 120 receives the group broadcast signal and code, it immediately checks the code. If the code is correct, Step 323 is jumped to; otherwise, Step 324 is jumped to.

Step 323: The control center 120 connects the GEUT 110 with other users that are set for group broadcast so that the user can broadcast to other users, and Step 25 is then jumped to.

Step 324: The control center 120 discards the group broadcast signal, and Step 25 is then jumped to.

Figure 8:
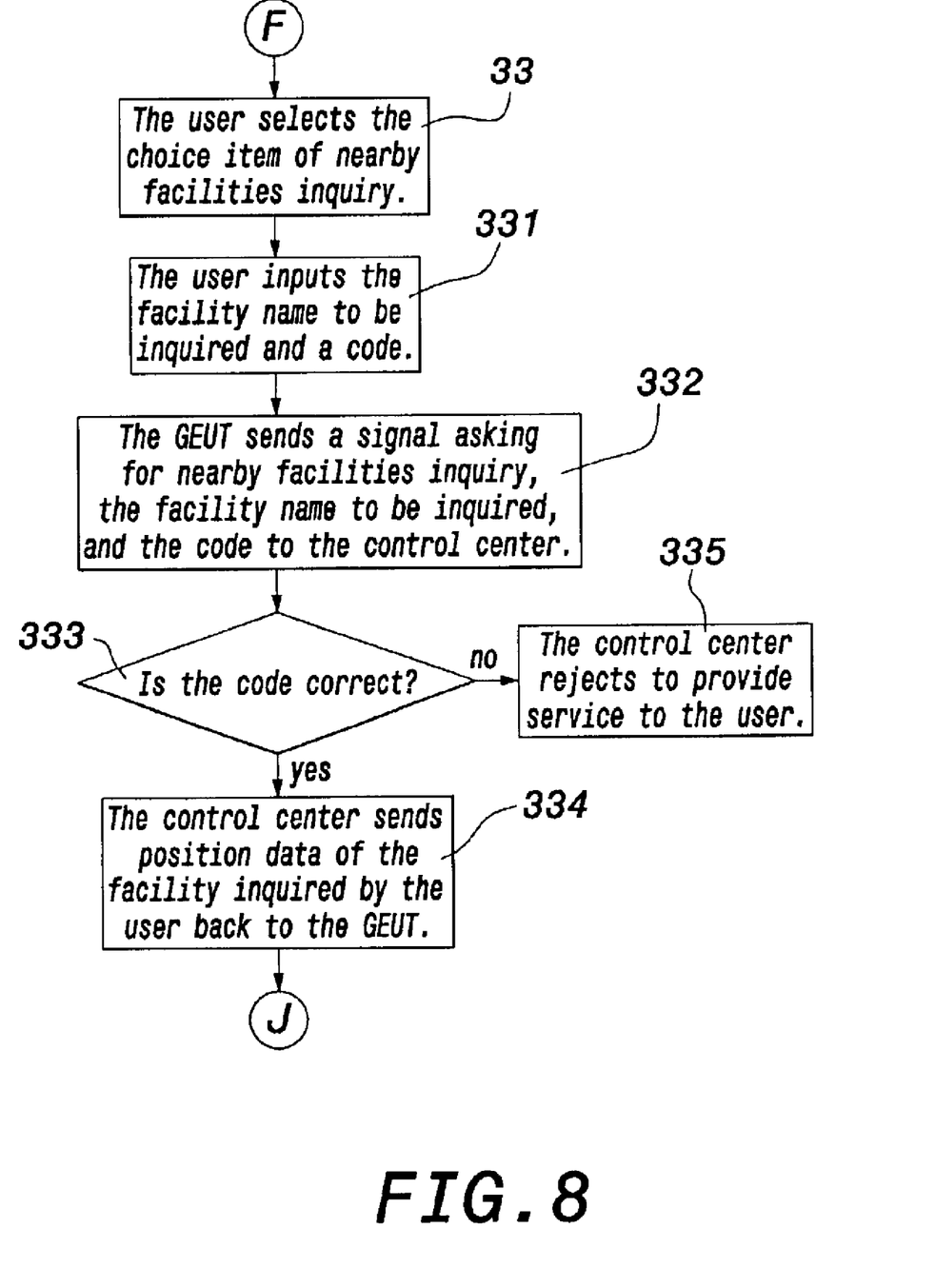
FIG. 8 is an operational flowchart of the nearby facilities inquiry service according to the embodiment of the present invention.

Step 33: The user selects the nearby facilities inquiry item.

Step 331: The user inputs the facility name to be inquired and the code for receiving messages of the control center 120.

Step 332: The GEUT 110 immediately sends out the nearby facilities inquiry signal, the facility name to be inquired, and the code to the control center 120.

Step 333: After the control center 120 receives the nearby facilities inquiry signal and code, it immediately checks the code. If the code is correct, Step 334 is jumped; otherwise, Step 335 is jumped to.

Step 334: The control center 120 sends position data of the facility inquired by the user back to the GEUT 110, and Step 25 is then jumped to.

Step 335: The control center 120 rejects to provide service to the user, and Step 25 is then jumped to.

Figure 9:
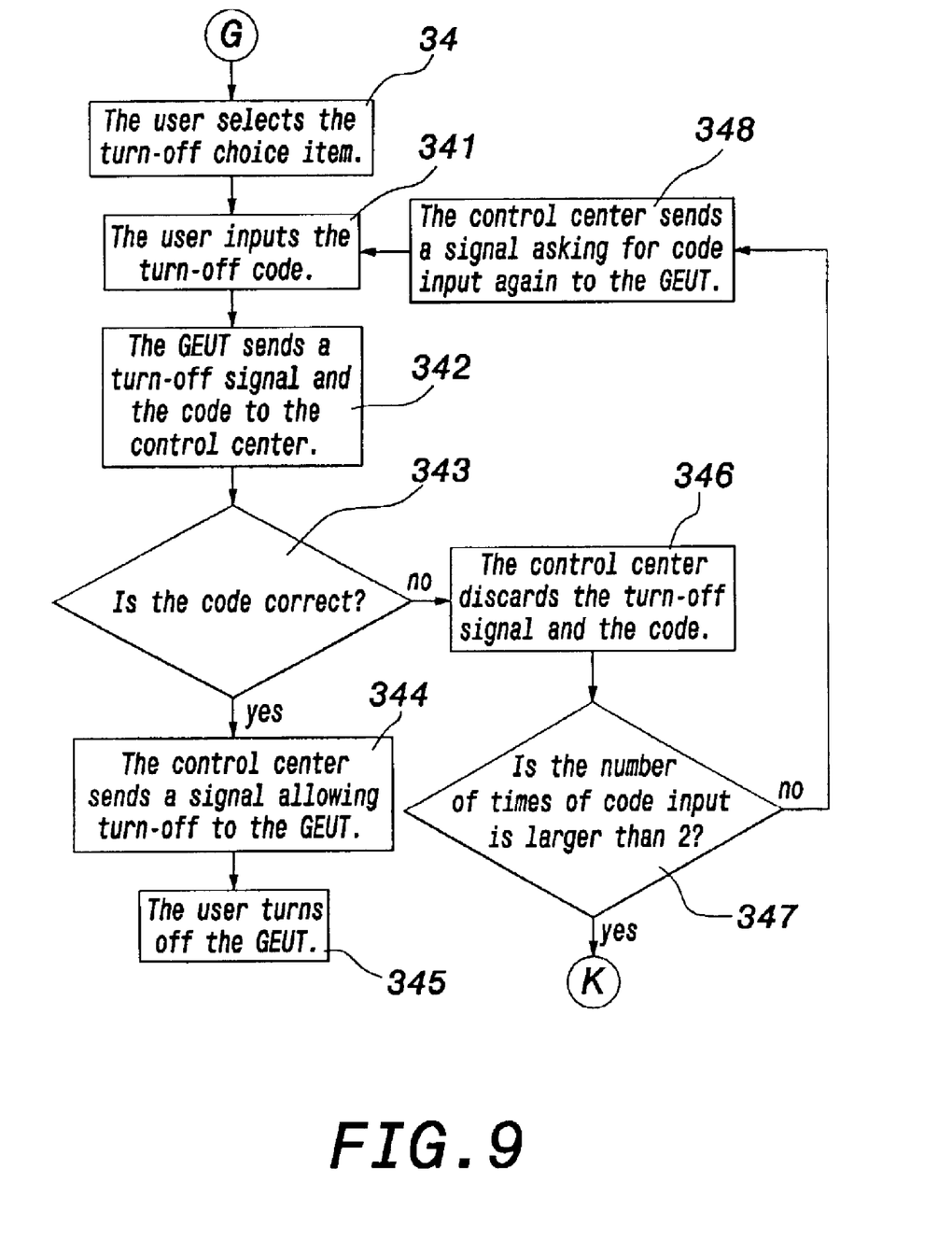
FIG. 9 is an operational flowchart of turning off according to the embodiment of the present invention.

Step 34: The user selects the turn-off item.

Step 341: The user inputs the turn-off code.

Step 342: The GEUT 110 sends the turn-off signal and code to the control center 120.

Step 343: After the control center 120 receives the turn-off signal and code, it immediately checks the code. If the code is correct, Step 344 is jumped to; otherwise Step 346 is jumped to.

Step 344: The control center 120 sends the signal allowing turn-off back to the GEUT 110.

Step 345: The user turns off the GEUT 110.

Step 346: The control center 120 discards the turn-off signal and code.

Step 347: The control center 120 checks whether the number of times of code input is larger than 2. If the answer is positive, Step 284 is jumped to; otherwise Step 348 is jumped to.

Step 348: The control center 120 sends a signal asking for code input again to the GEUT 110, and Step 341 is then jumped to.

Because the prevent invention provides personal safety guard to the user, before the user turns off the GEUT 110, he needs to input a turn-off signal to ensure the GEUT 110 be turned off normally. If the number of times of code input is larger than 2, the control center 120 considers that the GEUT 110 has been controlled by gangsters and that the user needs emergent help. However, the number of times of code input is not limited to 2 in practical design.

Figure 10:
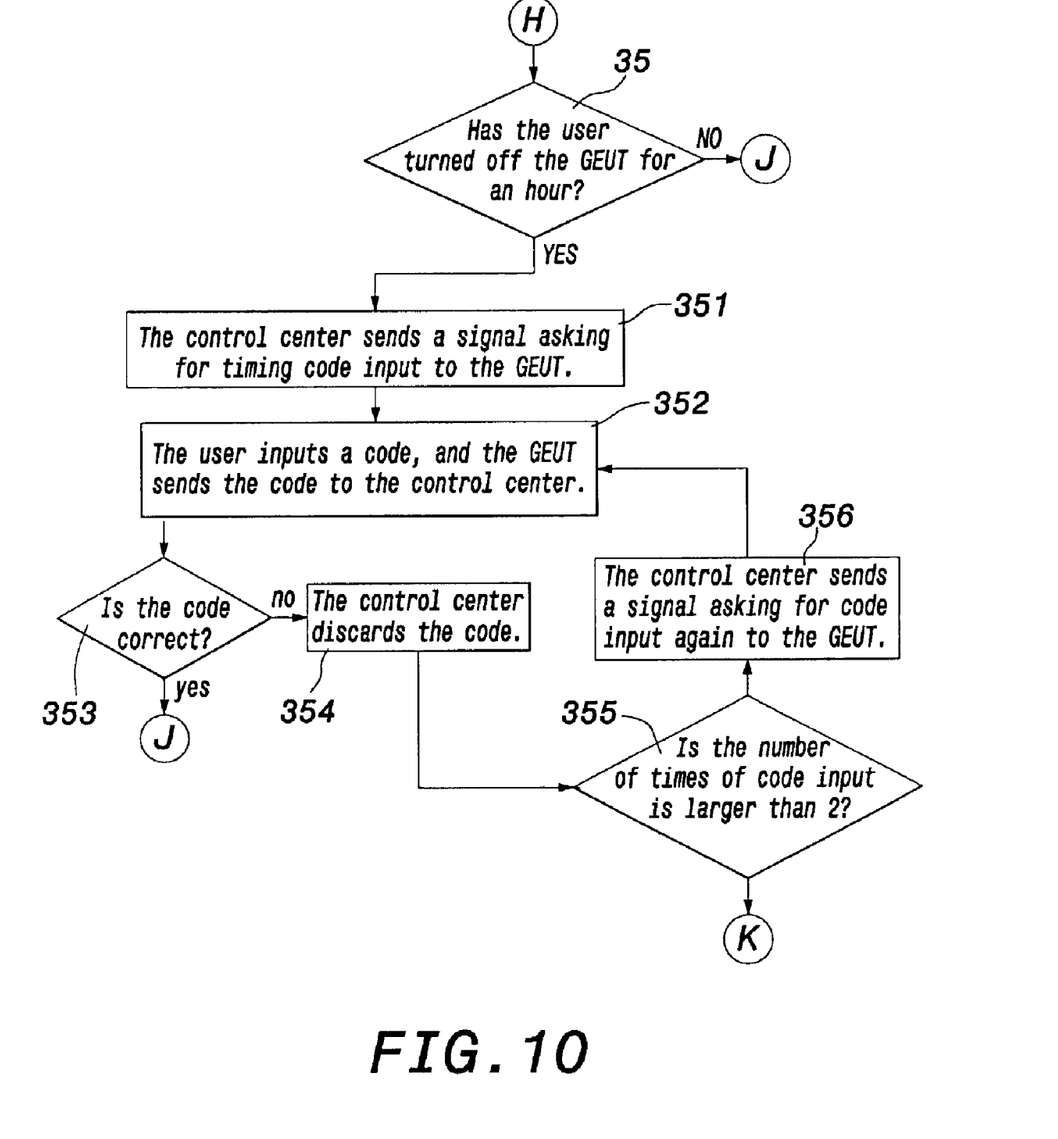
FIG. 10 is an operational flowchart of timing code input according to the embodiment of the present invention.

Step 35: The control center 120 detects whether the user has turned off the GEUT 110 for an hour. If the answer is positive, Step 351 is jumped to; otherwise, Step 25 is jumped to.

Step 351: The control center 120 sends a signal asking for timing code input to the GEUT 110.

Step 352: The user inputs the code, and the GEUT 110 sends the code to the control center 120.

Step 353: After the control center receives the code sent back by the user, it immediately checks the code. If the code is correct, Step 25 is jumped to; otherwise, Step 354 is jumped to.

Step 354: The control center discards the received code.

Step 355: The control center 120 checks whether the number of times of code input is larger than 2. If the answer is positive, Step 284 is jumped; otherwise, Step 356 is jumped to.

Step 356: The control center 120 sends a signal asking for code input again to the GEUT 110, and Step 352 is then jumped to.

Because the prevent invention provides personal safety guard to the user, a timing code input function is provided to ensure that the GEUT 110 functions normally. If the number of times of code input is larger than 2, the control center 120 considers that the GEUT 110 has been controlled by gangsters and that the user needs emergent help. However, the number of times of code input is not limited to 2 in practical design.

Figure 11:
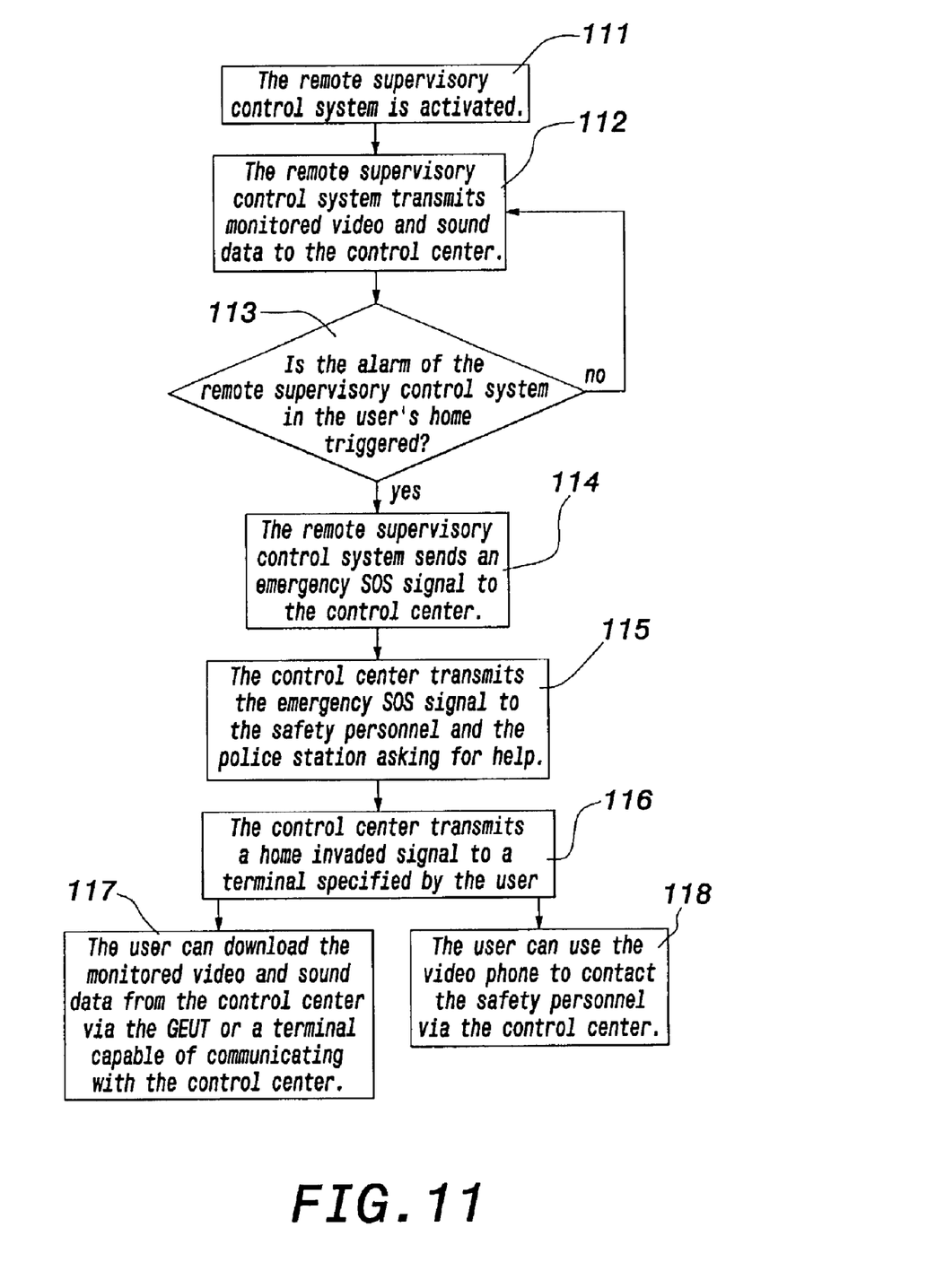
FIG. 11 is an operational flowchart according to another embodiment of the present invention.

As shown in FIG. 11, the present invention also provides home safety guard to the user. Before providing this service, the system administrant needs to install the remote supervisory control system 130 in the user's home and makes sure that it can communicate with the control center 120 through the communication network 140, thereby achieving bi-directional communication between the control center 120 and the remote supervisory control system 130. When the user's home is under threat, the present invention uses the installed system to provide home safety guard to the user. This embodiment of the present invention comprises the following steps.

Step 111: The remote supervisory control system 130 is activated.

Step 112: The remote supervisory control system 130 transmits monitored video and sound data to the control center 120.

Step 113: Whether the alarm of the remote supervisory control system 130 is triggered is judged. If the answer is positive, Step 114 is jumped; otherwise, Step 112 is jumped to.

Step 114: The remote supervisory control system 130 sends an emergency SOS signal to the control center 120.

Step 115: After the control center 120 receives the emergency SOS signal, it immediately transmits the emergency SOS signal to the safety personnel and the police station asking for help.

Step 116: The control center 120 transmits a home safety under threat signal to a terminal specified by the user to inform him. Meanwhile, if the user is at home, Step 118 is jumped to; otherwise, Step 117 is jumped to.

Step 117: The user can download the monitored video and sound data from the control center 120 via the GEUT 110 or a terminal capable of communicating with the control center 120 to watch real-time situation at home.

Step 118: The user can use the video phone to contact the safety personnel via the control center 120.

Figure 12:
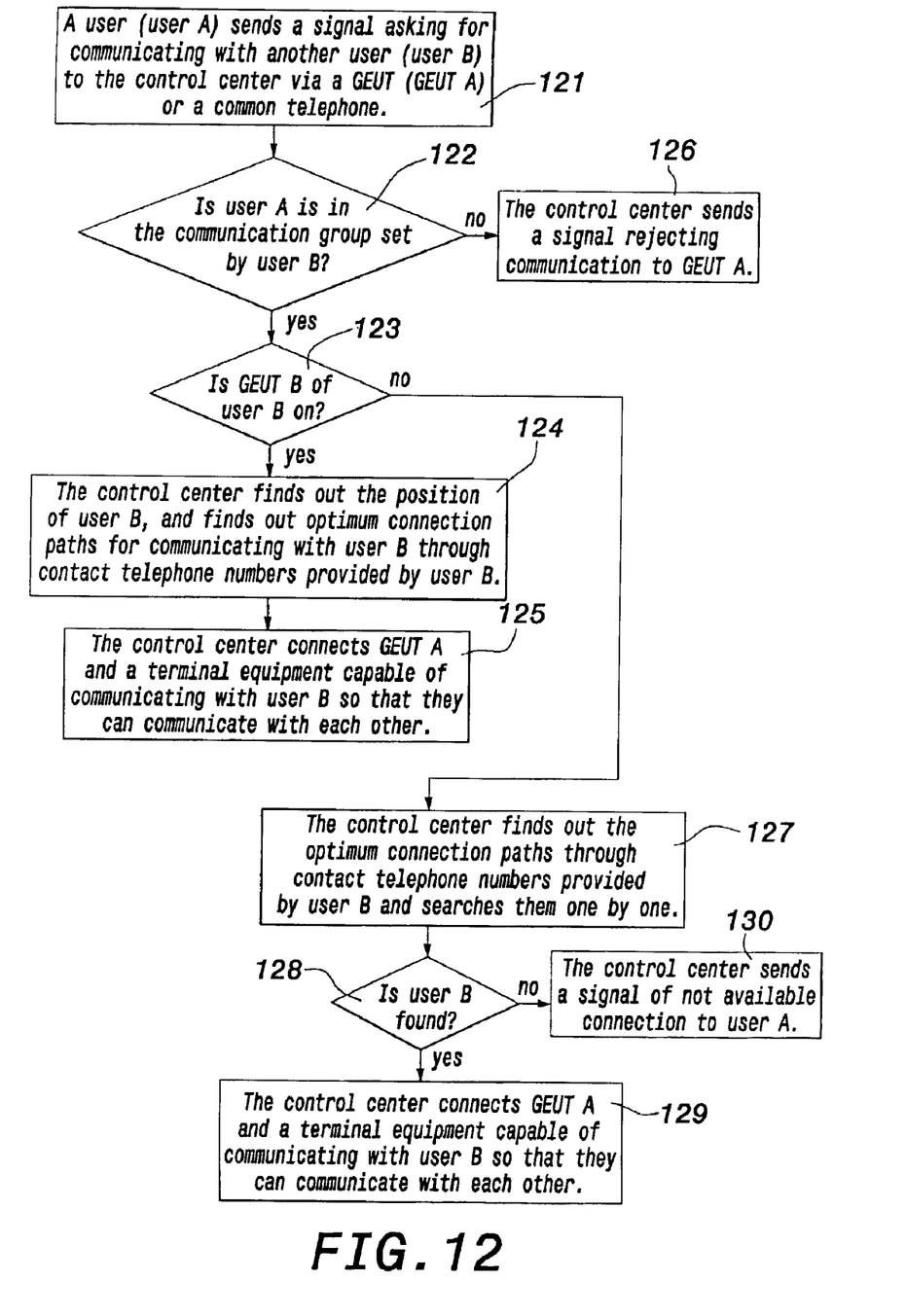
FIG. 12 is an operational flowchart according to yet another embodiment of the present invention.

As shown in FIG. 12, the present invention also provides the global communication service of single telephone number and the communication group setting service. This embodiment of the present invention comprises the following steps.

Step 121: A user (user A) emits out a signal asking for communicating with another user (user B) via a GEUT 110 (GEUT A) or a common telephone.

Step 122: After the control center 120 receives the signal asking for communicating with user B from user A, it immediately checks whether user A is in the communication group set by user B. If the answer is positive, Step 123 is jumped to; otherwise, Step 126 is jumped to.

Step 123: When the control center 120 makes sure that user A is in the communication group set by user B, it immediately checks whether GEUT B of user B is on. If the answer is positive, Step 124 is jumped to; otherwise, Step 127 is jumped to.

Step 124: The control center 120 finds out the position of user B, and finds out optimum connection paths for communicating with user B through contact telephone numbers provided by user B.

Step 125: The control center 120 connects GEUT A and a terminal equipment capable of communicating with user B so that they can communicate with each other.

Step 126: The control center 120 emits out a signal rejecting communication to GEUT A.

Step 127: The control center 120 finds out the optimum connection paths through contact telephone numbers provided by user B and searches them one by one.

Step 128: If the control center 120 finds user B through one-by-one search, Step 129 is then jumped to. Otherwise, Step 130 is jumped to.

Step 129: The control center 120 connects GEUT A and a terminal equipment capable of communicating with user B so that they can communicate with each other.

Step 130: The control center sends a signal of not available connection to user A.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A smart all-purpose expert management system comprising:
   a control center being a service center with a user database and a tracking management unit, said control center generating dynamic search data sequences according to inputted present or future schedule and demanded data range, generating information most suitable to user's requirement through interactive analysis of user's attribute data and related record data of the previously used service, and storing the information into said user database, said user database using said tracking management unit to automatically connect or exchange data with public/private databases through communication networks so as to perform work schedule arranged or reasonably formed in the user's schedule plan list, said smart all-purpose expert management system generating data or schedule service most required by the user, said control center immediately responding the new position or change of schedule to generate new search data sequences so as to automatically renew the content of said user database when a user inputs or changes the schedule plan list or when reading the geographic position of the user sent back through an end user terminal with a GPS device;
   an end user terminal with a GPS device being an user terminal equipment for opening services of said smart all-purpose expert management system, the user sending back a user discrimination code and longitude and latitude data though said end user terminal with a GPS device to let said control center momentarily collect and provide related data and service required by the user;
   a remote supervisory control system for communicating with said control center; and
   a communication network being a network system that can provide bi-directional communication between said control center with said end user terminal with a GPS device and said remote supervisory control system.

2. The smart all-purpose expert management system as claimed in claim 1, wherein said control center comprises a control unit, said user database, said tracking management unit, and system software.

3. The smart all-purpose expert management system as claimed in claim 1, wherein said control center can connect public or private databases, various kinds of service providers, and other terminal equipments through said communication network.

4. The smart all-purpose expert management system as claimed in claim 1, wherein said control center can provide a life schedule plan function.

5. The smart all-purpose expert management system as claimed in claim 1, wherein said control center can provide personal exclusive database management.

6. The smart all-purpose expert management system as claimed in claim 1, wherein said control center can provide automatic data inquiry service.

7. The smart all-purpose expert management system as claimed in claim 1, wherein said control center can provide a global communication service of single telephone number.

8. The smart all-purpose expert management system as claimed in claim 1, wherein said control center can provide a service of communication group setting.

9. The smart all-purpose expert management system as claimed in claim 1, wherein said control center can ensure the user's identity through the discrimination code sent back by said end user terminal with a GPS device, and can integrate the longitude and latitude data sent back by said end user terminal with a GPS device with an electronic map in said smart all-purpose expert management system to accurately determine the user's position and guard the user.

10. The smart all-purpose expert management system as claimed in claim 1, wherein said control center can connect said remote supervisory control system through said communication network to guard home safety for the user.

11. The smart all-purpose expert management system as claimed in claim 1, wherein said end user terminal with a GPS device can provide setting of codes, which include a turn-on code, a turn-off code, a timing code, and a code for receiving messages of said control center.

12. The smart all-purpose expert management system as claimed in claim 1, wherein said end user terminal with a GPS device can provide a choice item of emergency function key.

13. The smart all-purpose expert management system as claimed in claim 1, wherein said end user terminal with a GPS device can provide a choice item of traffic status inquiry.

14. The smart all-purpose expert management system as claimed in claim 1, wherein said end user terminal with a GPS device can provide a choice item of car dispatch.

15. The smart all-purpose expert management system as claimed in claim 1, wherein said end user terminal with a GPS device can provide a choice item of destination route inquiry.

16. The smart all-purpose expert management system as claimed in claim 1, wherein said end user terminal with a GPS device can provide a choice item of group broadcast.

17. The smart all-purpose expert management system as claimed in claim 1, wherein said end user terminal with a GPS device can provide a choice item of nearby facilities inquiry.

18. The smart all-purpose expert management system as claimed in claim 1, wherein said remote supervisory control system comprises a digital remote monitoring system, a video phone system, and a bi-directional sensor.

19. The smart all-purpose expert management system as claimed in claim 1, wherein said remote supervisory control system can provide monitored information of user's home environment to said control center via said communication network.

20. The smart all-purpose expert management system as claimed in claim 1, wherein said remote supervisory control system can let the user use a video phone thereon to contact safety personnel through said control center.

21. The smart all-purpose expert management system as claimed in claim 1, wherein said communication network can be a mobile phone network, a trunking radio network, a public switch telephone network, the Internet, a satellite communication network, or their combination.

* * * * *